Oct. 25, 1932.        C. F. SCHWENNKER        1,884,295
PROCESS OF WELDING
Filed June 21, 1929
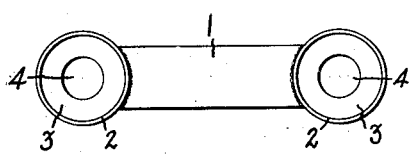
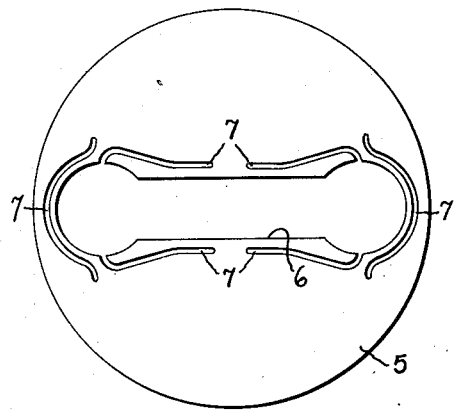
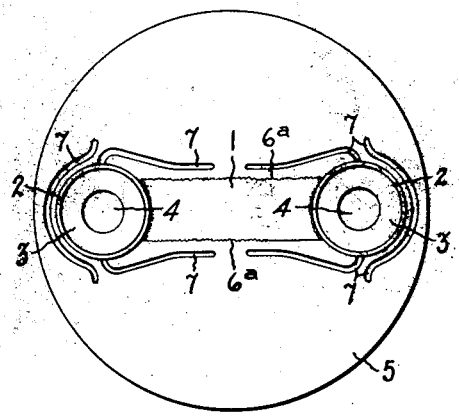
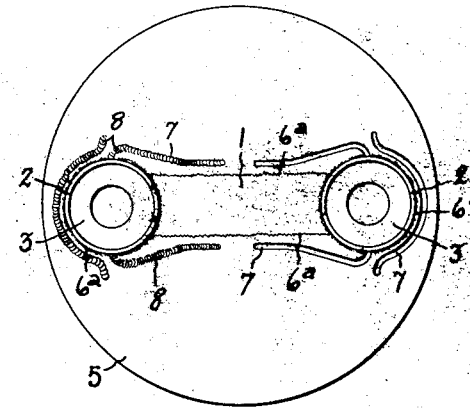
Inventor:
Charles F. Schwennker,
by Charles E. Tullar
His Attorney.

Patented Oct. 25, 1932

1,884,295

UNITED STATES PATENT OFFICE

CHARLES F. SCHWENNKER, OF SCHENECTADY, NEW YORK, ASSIGNOR TO GENERAL ELECTRIC COMPANY, A CORPORATION OF NEW YORK

PROCESS OF WELDING

Application filed June 21, 1929. Serial No. 372,769.

My invention relates to a method of welding metals, and more particularly to a method of efficiently welding together at comparatively high temperatures, metals whose coefficients of expansion differ to an appreciable extent, and the product formed thereby.

In ordinary torch welding operations, as where steel elements are welded together by the usual oxyacetylene torch, for example, stresses set up in the welded product due to contraction during the cooling period are normally not of such order of magnitude as to seriously weaken or fracture the same. When however the metals to be welded together are of such character that a welding temperature greatly in excess of that obtainable by oxyacetylene is required, as by the use of atomic hydrogen, for example, it will be apparent that appreciable difference in the coefficients of expansion of the metals will cause abnormal stresses to be set up during cooling thereof, tending to weaken or fracture the united structure, usually along a section parallel to the weld, unless the stresses so set up are compensated for in some manner.

My invention has for its principal object an improved method of welding wherein two metals having widely different coefficients of expansion, and requiring an unusually high welding temperature may be integrally joined without weakening or fracturing the united structure by stresses set up during the cooling period.

A further object of my invention is to provide a structure of rugged physical characteristics comprising a non-magnetic member integrally joined to a steel member, for supporting and spacing electrical conductors and for substantially eliminating heating of the structure due to alternating current flowing through said conductors.

By way of example, and without limitation thereto, my invention is illustrated in the accompanying drawing as applicable to the enclosing structure of an oil circuit breaker wherein; Fig. 1 is a non-magnetic member for supporting and spacing electrical conductors; Fig. 2 is a plan view of an oil circuit breaker cover member; Figs. 3 and 4 illustrate different steps in the method of joining the structures illustrated in Figs. 1 and 2.

It is well known that oil circuit breakers of large capacity must be constructed to withstand sudden and violent internal pressures, due to the rapid generation of gases by the action of the power arc on the oil, or other arc extinguishing medium. Furthermore, in the case of alternating current systems, a large amount of heat will be generated by eddy currents in the cover structure, which is generally of magnetic material such as steel, unless non-magnetic structure is interposed between the conductor studs associated with the breaker. In the present invention non-magnetic structure surrounds and is interposed between the conductor studs and is integrally united to a steel cover member to form a mechanically rugged structure.

Referring to Fig. 1, the non-magnetitc structure for substantially eliminating eddy currents in the cover structure, comprises a bar-like bridging member 1 of non-magnetic material. In the present instance the material employed is a non-magnetic chromium-iron alloy having the trade name of "Allegheny Metal No. 22". A typical analysis of this commercial alloy is as follows: chromium 17-19%, nickel 7-9%, carbon (minimum) 0.12%, carbon (maximum) 0.2%. This material is about 50% stronger than mild steel, is non-magnetic, and fuses at an appreciably higher temperature than that of steel, namely at approximately 1475° C. The coefficient of expansion of this alloy is also appreciably different from that of steel. It may be welded to steel by the use of atomic hydrogen which produces a sufficiently high welding temperature.

Member 1 is secured, as by welding, at each end, to bushings 2, within which are also integrally secured as by welding the bushings 3, the bushings 2 and 3 being composed of the chromium-iron alloy above referred to. Conductor studs (not shown) are adapted to extend through the central apertures 4 in bushings 3.

The cover member for the circuit breaker, Fig. 2, comprises a circular or dome-shaped member 5, of steel, having an irregularly shaped aperture 6. Spaced a short distance from the edges of aperture 6 are slots 7 suitably formed in member 5, as by a cutting operation with an oxyacetylene torch. Slots 7 are preferably closely adjacent the edges of aperture 6, and extend substantially parallel thereto for a purpose hereinafter described.

Referring to Figs. 3 and 4, the non-magnetic and magnetic structures above described are integrally united by inserting the non-magnetic structure within aperture 6 and welding it at 6a to form a union with the steel cover member 5 at the high temperature required, as by atomic hydrogen welding.

Due to the fact that the intense heat developed by the welding operation raises the temperature of the entire cover structure to a considerable extent, the steel portions surrounding the chromium-iron alloy will tend to contract and pull away from the same during the cooling period, by reason of the unequal coefficients of expansion of the two materials joined together. If no provision were made for the above described unequal changes during cooling of the structure, the stresses set up adjacent the weld or union 6a would either seriously weaken the metal along the weld, or would actually cause fracture of the same, usually along the weld itself.

To obviate the above difficulties, I dispose the slots 7 in the steel member 5 in such a manner that the contractive forces set up during the cooling period are substantially transverse thereto. Consequently the steel which is sufficiently ductile, flows slightly under the forces set up to widen the slots, and thereby permit contraction of the steel without straining or fracturing the metal at the weld. By disposing the slots discontinuously and closely adjacent the weld, the amount of steel between the slots and the weld is comparatively small so that the stresses set up by a shrinkage of this isolated section is unimportant. The slots, therefore, in effect serve as shields for preventing the large contractive forces from acting directly on the weld.

After the united structure has cooled sufficiently, slots 7 may be filled with material, as fused lightly fluxed steel weld rod 8 so that the cover structure may be as mechanically strong as an integral member.

The above method and product permits a considerable saving in cost of oil circuit breaker construction of the above described type, due to the fact that it has not been heretofore possible to weld successfully a non-magnetic metallic structure to a steel cover member. The cost of an integral cover structure composed entirely of a non-magnetic metal would be prohibitive, and the weight of the apparatus in order to have sufficient strength to withstand the explosive forces developed during rupture of the circuit would be increased.

What I claim as new and desire to secure by letters patent of the United States, is:

1. The method of welding at high temperatures a metallic insert to a metal having a different coefficient of expansion which comprises forming slots in the outer metal adjacent and substantially parallel to the union to be formed, and subsequently welding the metals to form said union.

2. In a system of welding at high temperatures a metallic insert to a metal having a different coefficient of expansion, the method which comprises forming slots in the outer metal adjacent and substantially parallel to and surrounding the union to be formed for relieving cooling stresses, welding the metals to form said union, and filling said slots with metal after the united structure has cooled.

3. In a system of welding at high temperatures an insert of non-magnetic metal to a magnetic metal having a different coefficient of expansion, the method which comprises forming slots in the magnetic metal substantially transversely to the direction of contraction of said metal and surrounding the union to be formed, welding the metals to form said union and filling the slots in the magnetic metal with similar metal after the united structure has cooled.

4. In a system of welding a chromium-iron alloy insert to steel, the method which comprises forming discontinuous slots in the steel adjacent and substantially parallel to the union to be formed for relieving the cooling stresses at said union, welding said metals to form said union, and filling said slots with fused metal after the united structure has cooled.

5. The method of welding a non-magnetic insert having apertures in spaced relation for receiving electrical conductors to a steel cover structure for alternating current electrical apparatus comprising forming an opening in said steel cover corresponding in size and shape to said insert, forming slots in said steel cover substantially around and parallel to the edge of said opening, welding said insert within the opening to said steel cover, and filling said slots with fused metal after the united structure has cooled for restoring the strength of the steel cover structure.

6. The method of welding a non-magnetic insert comprising a chromium-iron alloy having apertures in spaced relation for receiving electrical conductors to a steel cover structure for alternating current electrical apparatus comprising forming an opening in said steel cover corresponding in size and shape to said insert, forming discontinuous slots in said steel cover adjacent and substantially parallel to the periphery of said opening, welding said insert within the opening to said steel cover at a high temperature, and filling said slots with fused metal after the united structure has cooled for restoring the strength of the steel cover structure.

In witness whereof I have hereunto set my hand this 20th day of June, 1929.

CHARLES F. SCHWENNKER.